United States Patent [19]

Brueschke et al.

[11] Patent Number: 5,164,424
[45] Date of Patent: Nov. 17, 1992

[54] POLYMER HAVING A BETAINE STRUCTURE, SOLUTION DIFFUSION MEMBRANE, PROCESS FOR PRODUCING SAME AND USE THEREOF

[75] Inventors: Hartmut E. A. Brueschke, Nubloch; Guenter F. Tuesel, Bad Homburg; Guido Ellinghorst, Overrath; Axel Niemoeller, Cologne, all of Fed. Rep. of Germany

[73] Assignee: Deutsche Carbone AG, Fed. Rep. of Germany

[21] Appl. No.: 675,107

[22] PCT Filed: Dec. 16, 1987

[86] PCT No.: PCT/DE87/00594
§ 371 Date: Aug. 16, 1989
§ 102(e) Date: Aug. 16, 1989

[87] PCT Pub. No.: WO88/04677
PCT Pub. Date: Jun. 30, 1988

Related U.S. Application Data

[63] Continuation of Ser. No. 372,379, Aug. 16, 1989, abandoned.

[30] Foreign Application Priority Data

Dec. 19, 1986 [DE] Fed. Rep. of Germany ....... 3643574

[51] Int. Cl.$^5$ ................................. C08J 3/28
[52] U.S. Cl. .................................. 522/116; 522/118; 522/120; 522/124; 522/149; 210/640
[58] Field of Search ............... 522/116, 118, 120, 124, 522/149; 210/640

[56] References Cited

U.S. PATENT DOCUMENTS

| 3,666,693 | 5/1972 | Chapiro et al. | 260/2.5 R |
| 4,113,912 | 9/1978 | Okita | 428/315.5 |
| 4,608,393 | 8/1986 | Hamano | 522/124 |
| 4,865,743 | 9/1989 | Ellinghorst et al. | 522/116 |

FOREIGN PATENT DOCUMENTS

032622 A1 12/1980 European Pat. Off. .
380373 9/1964 Switzerland .

OTHER PUBLICATIONS

Chemical Abstract, 96:218326q, Le Chau Thanh, et al., Single-Stage Synthesis of a Graft Copolymer of Cellulose with Polyampholyte Properties, 1982.

Primary Examiner—Marion E. McCamish
Assistant Examiner—Mark A. Chapman
Attorney, Agent, or Firm—Arnold, White & Durkee

[57] ABSTRACT

A polymer is disclosed which has a betaine structure on at least one side chain. The polymer according to this invention is suitable for use as a material for producing a pervaporation membrane. A process is described for producing the polymer according to this invention whereby betaine groups are introduced into a starting polymer. The betaine groups are introduced into the starting polymer by irradiation of the starting polymer with ionizing radiation and then treatment of the irradiated starting polymer with monomers that are capable of a graft reaction. Monomers that either already contain a betaine function or are capable of forming such a function are used. The betaine can be formed, e.g., by alkylating quaternation of a nitrogen atom present in the monomer if an acid group is introduced simultaneously with the alkylating agent.

45 Claims, No Drawings

POLYMER HAVING A BETAINE STRUCTURE, SOLUTION DIFFUSION MEMBRANE, PROCESS FOR PRODUCING SAME AND USE THEREOF

This application is a continuation of application Ser. No. 07/372,379, filed Aug. 16, 1989, now abandoned.

DESCRIPTION

This invention concerns new polymers and a process for producing such polymers that are suitable as material for solution diffusion membranes. In another regard this invention concerns the use of such solution diffusion membranes for pervaporation.

Pervaporation is a separation process whereby a liquid to be separated, generally a liquid mixture, is brought in contact with a first or feed side of a suitable membrane. If the vapor partial pressures of the components of the fluid or liquid on the second or permeate side of the membrane are kept at levels lower than the corresponding values on the first side, the result is a driving force for the movement of these components through the membrane. The components pass through the membrane at different rates in accordance with their respective permeabilities where the permeability is dependent in a complex manner on a number of different parameters which include, for example, the type and concentration of the permeating species, the type and structure of the membrane, the composition of the fluid or liquid, the temperature, etc. Since the vapor partial pressures on the second side of the membrane are lower than those on the first or feed side, the components evaporate after passing through the membrane and thus form a vapor permeate. This process is therefore known as "pervaporation". Due to the difference in permeabilities of the components of the liquid mixture, the permeate has a different composition than the liquid on the feed side, so the liquid is separated into its various components.

Under the assumption that a sufficiently high difference in vapor partial pressures is maintained between the feed side of the membrane and the permeate side, the separation efficiency of a given membrane with regard to a given feed liquid depends only on the permeabilities of the components in question. Only nonporous membranes can be used for pervaporation. This means that the membrane does not have continuous pores large enough for the liquid, especially the liquid mixture, to be able to flow through the membrane through its pores as a result of the pressure difference. It is generally assumed that the solubility of one component in the membrane material, together with the diffusion behavior, controls the mass transport through the membrane. Pervaporation is a dynamic nonequilibrium process in which transport phenomena determine the separation efficiency of a membrane.

The process of pervaporation with the help of membranes is generally known and has been described in the literature (see S. K. Hwang, K. Kammermeyer, *Membranes in Separation*, John Wiley & Sons, New York, 1975; R. Rautenbach, R. Albrecht, *J. Membr. Sci.*, 7 (1980); G. Tusel, H. Brüschke, *Desalination*. 53 (1985); J. Neell et al., *Desalination*, 53, 1985 (297) and J.-P. Brunn et al., *J. Membrane Science.* 25 (1985) 55).

Since the separation efficiency of a membrane used for pervaporation is determined by transport phenomena as mentioned above, the nature of the material used to produce the membrane is especially important. It is known in this regard that the properties of certain plastics can be modified by treatment with physical and chemical agents in such a way that they are rendered especially suitable for use in pervaporation. One such process is described, for example, in German Patent DE-A 3,515,184.6 where homogeneous, dense films are irradiated with accelerated electrons and then subjected to radical graft copolymerization with monomers whereby groups capable of forming a salt with the help of the monomers are introduced into the polymer.

The polymer then has ion exchange properties and in the salt form of ion exchange it has an especially good selectivity for use in pervaporation.

Membrane materials, according to German Patent DE-A 3,515,184.6, gradually lose their good properties with respect to high selectivity and high permeate flow in unavoidable ion exchange. Membranes according to German Patent DE-A 3,514,184.6 [sic; 3,515,184.6] therefore cannot be used in the long run for separation of water from aqueous organic liquid mixtures by pervaporation.

One problem on which the present invention was based was to make available a polymer that can be used in membrane form with improved properties for use in pervaporation. In particular, such membranes should also be suitable for pervaporation of aqueous mixtures with a long lifetime and at the same time should have a high selectivity and permeability for water. Another aspect of this invention is to make available a process with which such a polymer can be produced by a method that can be handled easily on an industrial scale.

This invention thus concerns a polymer as defined in the claims. This invention also concerns a process for producing such a polymer and the use of this polymer to produce a polymer membrane that is suitable for pervaporation as defined in the claims.

The polymer

The polymer according to this invention is a polymer with a main molecular chain and is characterized in that it has a betaine function in at least one side chain. Preferably the polymer according to this invention has a main chain of general formula I

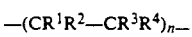

$$-(CR^1R^2-CR^3R^4)_n-$$

where the substituents $R^1$ to $R^4$, which may be the same or different, stand for H, Cl or F atoms, alkyl groups or substituted alkyl groups, especially halogen-substituted alkyl groups, preferably with 1 to 8 carbons, aryl groups or substituted aryl groups, especially halogen-substituted aryl groups, preferably with 6 to 18 carbons, heterocycles or CN groups, or where at least one of the substituents $R^1$ to $R^4$ in turn consists of a polymer chain of the same or different monomer units which may in turn be substituted, and n is an integer, and this invention is characterized in that the polymer has at least one betaine function formed by grafting with a monomer that is capable of forming a betaine function.

The betaine structure is implemented either by the fact that its positive center is present in one of the substituents $R^1$ to $R^4$ and its negative center is in another substituent $R^1$ to $R^4$ or preferably by the fact that at least one of the substituents $R^1$ to $R^4$ on at least one of the monomer units $(CR^1R^2-CR^3R^4)$ of the polymer contains both the positive and the negative centers of the betaine function.

Thus, one or more of the substituents $R^1$ to $R^4$ in one or more units $(CR^1R^2-CR^3R^4)$ may have one or more betaine functions. If there are several betaine functions in the polymer, then preferably at least one of the substituents $R^1$ to $R^4$ in one or more of the units $(CR^1R^2—CR^3R^4)$ is in turn a polymer chain which is composed of monomer units containing the same or different betaine functions optionally together with other monomer units as defined above for $R^1$ to $R^4$. Side chains of monomer units in which each monomer unit of the side chain has a betaine function are currently preferred.

The term betaine function or betaine structure as used below is understood to mean that there is at least one negatively charged center and at least one positively charged center in the polymer according to this invention, so and their charges cancel each other on the whole and the polymer molecule appears neutral toward the outside. The negative center and the positive center do not have free mobility, which is hindered only insignificantly as in an ion exchange salt, but instead they are fixed by incorporating the polymer molecule especially by way of covalent bonds, for example. The terms zwitterion or internal salt have also been used for such a charge structure.

Backbone polymer and starting polymer

It is not necessary for each unit $(CR^1R^2—CR^3R^4)$ in the starting polymer to be occupied by substituents $R^1$ to $R^4$ in the same way. Instead, the substituent positions in the polymer molecule may vary, i.e., the starting polymers may be homopolymers and copolymers.

If only carbon, hydrogen, fluorine and chlorine atoms are used to form the polymer according to this invention, then the following combinations of these atoms are especially suitable, but it should be pointed out that this characterizes only the backbone polymer without the betaine structure:
—H₂C—CH₂—, —H₂C—CHCl—, H₂C₂—CHF—, —H₂C—CF₂—, —F₂C—CF₂—, —F₂C—CFCl—, H₂C—CH(CH₃)—, CHF—CF₂—

If CN groups or alkyl groups are used as substituents $R^1$ to $R^4$ to form the polymer molecule, use of only one of these groups is preferred and then the other three substituents are formed by hydrogens. Of the alkyl groups, the methyl groups are especially preferred.

A suitable halogenated alkyl group is the CF₃ group. Preferred examples of starting polymers include polyethylene, copolyers [sic; copolymers] of 90-99 mol% ethylene and 0.1-10 mol% higher olefin with 4-8 carbons, especially hexene and octene, polypropylene, polypropylene with up to 10 mol% ethylene comonomer, polyvinyl chloride, polyvinyl fluoride and polyvinylidene chloride, polytetrafluoroethylene, polyvinylidene difluoride and copolymers of polytetrafluoroethylene and partially fluorinated or perfluorinated ethylene and propylene.

According to this invention at least one of the substituents $R^1$ to $R^4$ on at least one of the $(CR^1R^2—CR^3R^4)$ units (referred to below as monomer units of the polymer) is formed by substituents with a group with at least one betaine function (referred to below as betaine groups).

Betaine function

A minimum of one betaine function or betaine group is preferably formed by a quaternary nitrogen as the positive center and an acid group as the negative center and both the quaternary nitrogen and the acid group are incorporated into the polymer molecule with covalent bonds. The quaternary, positively charged nitrogen atom may have the following bonding states:

II:

III:

In the case of bonding state II the quaternary nitrogen is preferably a heterocyclic nitrogen.

Preferred examples of suitable acid groups include carboxylic acid groups and sulfonic acid groups with the following functional groups:

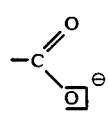

IV

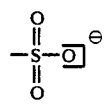

V

Especially suitable and therefore preferred groups with a betaine function are illustrated below by VI to IX

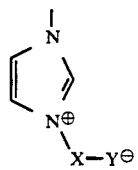

VI

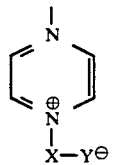

VII

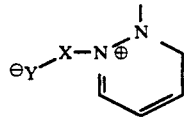

VIII

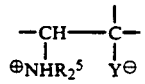

IX especially

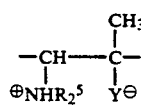

where the X group is a hydrocarbon group (hydrocarbon bridge) with 1 to 10 carbons and Y is an acid group, e.g., the carboxylate group IV or the sulfonate group V.

The hydrocarbon group X is preferably a branched or unbranched saturated aliphatic group with 1 to 10 carbons or an alkylaryl group such as the benzyl group.

$R^5$ in structure IX denotes an alkyl group preferably with 1-5 carbons. Several of the structural elements VI to IX, which may be the same or different, are arranged in series one after the other on the side chain (structures VI to VIII) or in the side chain (structure IX) and such an arrangement is preferred.

The advantage of the polymer according to this invention is that the two charge carriers no longer have free mobility with respect to each other due to the betaine-type incorporation of the positive and negative charges into the molecule as a whole. Thus, the polymer according to this invention is especially suitable as a material for forming a membrane for pervaporation because ion exchange in the membrane material due to the liquid being separated during the pervaporation process is ruled out even when the liquid mixture being separated contains free protons and hydroxyl ions. This yields membranes for pervaporation that have a much greater lifetime than the known membranes. The disadvantage that a high selectivity and high flow rate in permeation can be achieved with the known membranes having a salt-like structure only at the price of a short lifetime of the membrane material is thus overcome.

Producing the polymer

This invention also concerns a process for producing the polymer with a betaine function according to this invention. In this process a starting polymer having general formula is used: $CR^1R^2\text{-}CR^3R^4)_n$ (I)

Starting polymers that are especially suitable for the process, according to this invention include polyethylene (PE, mp≃130° C.), polypropylene (PP, mp≃180° C.), polyvinyl chloride (PVC, mp≃180° C.), polyvinyl fluoride (PVF, mp≃185° C.), polyvinylidene fluoride (PVF$_2$, mp=170° C.), poly(tetrafluoroethylene-co-hexafluoropropene) (PFEP, mp≃260° C.), poly(tetrafluoroethylene) (PTFE, mp≃330° C.), poly(chlorotrifluoroethylene) (PCTFE, mp≃264° C.) and polyacrylonitrile (PAN, mp≃317° C.), where mp stands for melting point. Polyvinylidene fluoride and polyvinyl fluoride are especially preferred here.

In a preferred version, polymers in axially or biaxially drawn form are used as the starting polymers. In this way it is possible to reduce the swelling capacity of the polymer according to this invention, and the dimensional stability of membranes produced from them is increased.

Irradiation

In the process according to this invention the starting polymer is exposed to ionizing radiation. The term ionizing radiation as used below is understood to refer to all the high energy forms of radiation with which a person skilled in the field will be familiar and with which it is possible to produce radicals and/or radical ions in an organic molecule. Such high energy radiation may include γ radiation, e.g., a $^{60}Co$-γ radiation or β radiation, i.e., electron radiation. The process according to this invention is preferably carried out with electron radiation produced by acceleration of electrons to a preselected energy level. The dose rate should be at least 1 kGy/sec, and should preferably be in the range of 3 to 50 kGy/sec (0.3 to 5 MRD/sec). However, much higher dose rates may also be used, e.g., up to 5000 kGy/sec as permitted by high power electron accelerators in large-scale industrial applications.

The electron energy used in the process depends on the form of the material for irradiation, especially its thickness, but should be at least 150 keV.

Suitable radiation doses for the process according to this invention may be in the range of 10 to 1000 kGy (1 to 100 Mrd).

Grafting

Reactive centers are created in the starting polymer by treatment with ionizing radiation, thus making it possible to graft the graft monomer onto the polymer in a subsequent process step. The reactive centers are mostly radical centers or radical ionic centers that have such a long lifetime that sufficient time is available for carrying out such a subsequent process step. Grafting of the graft monomers is referred to below as the grafting reaction.

Depending on the total number of reactive centers created in the first process step, the graft monomers are attached to the irradiated starting polymer by means of the grafting reaction. As a rule, polymerizing grafting takes place at the resultant branching points, i.e., several molecules of the graft monomer react in succession and the graft monomers are linked together in a chain. Thus a side chain that was not previously present on the starting polymer is formed by the grafting reaction and at least one of the substituents $R^1$ to $R^4$ of the polymer according to this invention is preferably in a polymer chain and the side chain is referred to below as the polymer side chain. The polymer side chain may be of a homopolymer or copolymer type.

Molecules that are capable of a graft reaction with the irradiated starting polymer can be used as the graft monomers. Preferably graft monomers with a molecular weight of about 30 to about 500 are used. If the grafting reaction takes place by way of an essentially radical mechanism, graft monomers that are capable of a radical grafting reaction are suitable for this process. If it is desirable to attach more than one graft monomer to a branching point created by irradiation by the method described above, then polymerizable compounds (or radically polymerizable compounds in the case of a reaction mechanism that takes place by way of radicals) can be used as the graft monomers. Depending on whether a homopolymer or copolymer side chain is desired, only one type of graft monomer or a mixture of several types of graft monomers is used for the polymerizing grafting reaction.

Graft monomers capable of the grafting reaction include, for example, monomers with a double bond that can be used for polymerization. Suitable graft monomers thus include, for example, those with a vinyl group and especially derivatives of acrylic acid but also methacrylic acid.

Since the goal is to introduce at least one betaine function into the starting polymer by means of the grafting reaction, the graft monomers must not only be capable of entering into the grafting reaction but must also contain either functional groups that form at least one betaine function or they must contain at least one functional group that if suitable for forming a betaine, function and is converted to a betaine function following the grafting reaction (in addition to the ability of the graft monomers to enter into the grafting reaction). The first type of process is referred to below as a one-step process below while the second type of process is referred to as a multi-step process. According to this invention it is preferable for the positive center of the betaine function to be formed by a quaternary nitrogen or phosphorus atom (ammonium or phosphonium structure) and for its negative center to be formed by an acid group.

The choice of the process depends first on the lifetime of the reactive centers created by the irradiation in the starting polymer and secondly it depends on the time needed by the graft monomer to diffuse into the starting polymer and reach these centers in order to react with them. Fundamentally, it is desirable to graft the starting polymer over its entire extent in order to obtain material with the desired quality for pervaporation throughout the membrane. If a graft monomer with a betaine function that diffuses into the irradiated starting polymer at an adequate rate is available and if the irradiated starting polymer to be grafted has only a minor thickness, then preferably the one-step process is used.

However, if sufficient time to achieve complete grafting is not available—depending on the lifetime of the reactive centers and the diffusion rate of the graft monomer in the starting polymer—then a multistep process is preferred. In this process graft monomers in which the betaine function has either not yet been formed or is rendered temporarily ineffective by a protective group are used. In such cases the effect of a betaine function is not present, so the hydrophobic properties of the graft monomers and consequently their rate of migration in the irradiated starting polymer are increased. Complete grafting therefore proceeds in a shorter period of time accordingly.

One-step process

Examples of graft monomers suitable for the one-step process include amino acids with an olefin double bond such as vinylalanine or corresponding chemically modified amino acids where those with a vinyl group are preferred. Additional examples of graft monomers for a one-step process include 1-vinyl-3-carboxymethylimidazole(betaine) or derivatives of acrylic acid or methacrylic acid or other carboxylic acids with a vinyl group where the derivatives contain the peralkylated amino groups. In general, the preferred graft monomers with a betaine function that are capable of entering into the grafting reaction are those in which the positive center of the betaine function is formed by quaternary nitrogen and the negative center is formed by an acid group. The acid group may be, for example, a sulfonate group or a phosphonate group. In addition, to by a quaternary nitrogen, the positive center may also be formed by a quaternary phosphorus atom (phosphonium group).

Multistep process

Even in the multistep process the betaine function is preferably formed on the whole by a quaternary nitrogen as the positive center and an acid group as the negative center.

A first variant of the multistep process consists of performing the grafting with a graft monomer that has a double bond capable of the grafting reaction, a nitrogen and an acid group, but the acid group has a protective group in the sense that it is esterified. In this form the monomer has a strong hydrophobic property and thus has a high diffusion rate in the irradiated polymer as described above. After the grafting reaction has been carried out, the esterified acid group is saponified and the nitrogen is quaternated. Examples of monomers suitable for the first variant of the multistep process include esters of aminated acrylic acid or methacrylic acid.

In a second variant of the multistep process, grafting is performed with monomers that have a functional group that is suitable for a subsequent reaction with which the betaine is formed or introduced into the starting polymer. This can be achieved, for example, by providing a nitrogen on the functional group with which an alkylating agent reacts, so this nitrogen is quaternated (ammonium structure) in which case the alkylating agent also has a negatively charged group at the same time (preferably an acid group). Since quaternation of the nitrogen yields a positive charge which can serve as the positive center of the betaine functions, this yields the betaine together with the negative charge of the group introduced. Heterocyclic graft monomers containing nitrogens are especially preferred here. Suitable quaternating alkylating agents with a negative group include halogenated aliphatic carboxylic acids, preferably chlorinated or brominated, aliphatic carboxylic acids or their salts and esters, in which case the negative group introduced is a carboxylate group. When using esters of such halogenated carboxylic acids, subsequent saponification is necessary to release the carboxylate group, or quaternating alkylation is performed under saponifying conditions. In addition to aliphatic carboxylic acids, benzoic acids with a halogenated alkyl group on the aromatic ring such as p-chloromethylbenzoic acid or p-bromomethylbenzoic acid or the salts and esters thereof are also suitable. The negatively charged group of the alkylating agent may also be a sulfonate group. In this case, halogenated aliphatic sulfonic acids or the salts thereof are used. In addition, cyclic esters of aliphatic sulfonic acids, so-called sultones, are also suitable.

The quaternating alkylating agents described above preferably have from 1 to 10 carbons. Of the process variants discussed here, the second variant of the multistep process is preferred and it is especially preferred to use graft monomers with a nitrogen as the functional group and to quaternate the nitrogen while introducing a negative group. The nitrogen can be in bonding state X or XI where the dotted lines in formula XI indicate that this may also be a heterocyclic incorporation.

X

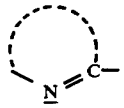

XI

Substituted or unsubstituted olefins provided with betaine precursors, preferably 1-olefins, are especially preferred for attachment to the carbons of the backbone polymer in the multistep process.

Monomers suitable for the second variant of the multistep process thus have the structural elements and functional groups according to XII and XIII, where Z denotes an organic group bridging the olefinic double bond and the nitrogen and R is hydrogen or an aliphatic group with 1 to 3 carbons. The bonding state of the nitrogen in structure XIII corresponds to XI and the heterocyclic form of incorporation of the nitrogen is preferred.

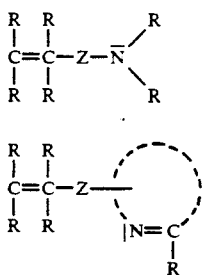

Especially suitable monomers for the second variant of the multistep process include 2-vinylpyridine, 4-vinylpyridine and N-vinylimidazole. Suitable alkylating agents include, for example, halogenated carboxylic acids and salts thereof such as chloroacetic acid, bromoacetic acid, 4-(bromomethyl)benzoic acid, 2-bromopropionic acid, 3-bromopropionic acid, halogenated carboxylic acid esters such as methyl bromoacetate, sultones such as γ-propanesultone, δ-hexanesultone, and halogenated sulfonic acids and the salts thereof such as 1-bromoethanesulfonic acid sodium salt and 4-(bromomethyl)benzenesulfonic acid. If the starting polymer is grafted, e.g., with N-vinylimidazole and if bromoacetic acid is used as the alkylating agent, the result is a betaine of structure XIV. However, if the grafting reaction is performed with 4-vinylpyridine as the monomer and γ-propanesultone, the result is a betaine with structure XV.

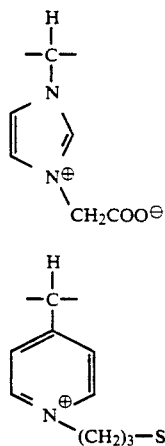

The irradiated starting polymer is brought in contact with the graft monomer or with a mixture of several graft monomers, preferably so they are in contact on all sides (after a certain waiting time). A mixture of several graft monomers is then used when a copolymer side chain is desired. A suitable contact time is in the range of 1 minute to 60 hours, preferably in the range of 10 minutes to 120 minutes. The graft monomers can be used in pure form or in a solvent, where preferred graft monomer concentrations are in the range of 20 to 80 wt%. Suitable solvents for the especially preferred graft monomers 2-vinylpyridine, 4-vinylpyridine, N-vinylimidazole and N,N-dimethylaminoethyl methacrylate include ethanol, water and water/ethanol mixtures.

Suitable temperatures for carrying out the grafting reaction include temperatures between 30° C. and 80° C., especially between 50° C. and 70° C. The monomer or mixture of monomers may optionally be tempered in advance.

Preferably, the conditions of the grafting reaction are maintained until the irradiated starting polymer has been grafted over its entire extent. The time necessary to accomplish this depends on a number of parameters which are described in detail in German Patent DE-A 3,515,184.6, to which reference is explicitly made here. These process parameters include the radiation dose, the waiting time between irradiation and coming in contact with the monomer(s), the process temperature and the monomer concentrations used in the reaction. To achieve an end product with a homogeneous quality, complete grafting of the starting polymer is especially desirable. The desired result can be monitored with the help of differential interference contrast microscopy on thin sections of grafted material. It has proven expedient to empirically determine the onset of grafting on sample pieces by means of this process.

The degree of grafting of the resultant grafted starting polymer is generally between 20% and 300%. To determine the degree of grafting a sample piece is dried to a constant weight and the degree of grafting (DG) is determined according to the equation $$DG = \frac{m - m_o}{m_o} * 100(\%)$$

where m is the weight of the grafted sample piece and m0 is the weight of the ungrafted sample piece.

In the case of a two-step variant of the process the grafting reaction is followed by conversion of the functional group of the monomer to a betaine function. Preferably, however, first the grafted starting polyolefin is extracted with polar solvents such as water, ethanol or water/ethanol mixtures to purify it of monomer residues or of polymer formed by transfer reactions and not attached by grafting to the starting polymer.

Of the alkylating agents already mentioned above as suitable for quaternating alkylation of a nitrogen in the monomer with the introduction of a negative acid moiety, bromoacetic acid, chloroacetic acid, δ-hexanesultone and γ-propanesultone are especially suitable. In general, the alkylating agents are preferably used as solutions where the concentration of the alkylating agent is in the range of 0.1 to 20 wt%, preferably in the range of 1 to 5 wt%. Suitable solvents include organic solvents, preferably polar organic solvents. Specific examples of suitable solvents include methanol, dimethylformamide, nitromethane, dimethyl sulfoxide and 95% ethanol. The reaction takes place by bringing them in contact on all sides, e.g., immersing the grafted starting polymer reaction material in a solution of the alkylating agent. Temperatures between 20° C. and 100° C., preferably 60° C. to 90° C., are suitable for the reaction, and reaction times between 1 minute and 60 hours, preferably from 5 minutes to 30 hours, are used.

When using halogenated alkylating agents, formation of the betaine function is concluded by bringing the sample material, especially the membrane, in contact with alkaline solutions such as 0.1 to 10% sodium hydroxide or potassium hydroxide solution, preferably 1 to 5% sodium hydroxide solution, thereby removing hydrohalic acids from the membrane.

The quantity of functional groups converted by the reaction in the graft copolymer is between 1% and 100% depending on the reaction conditions, but is preferably more than 40%.

Membrane and production of the membrane

According to this invention, the process described above can be used to advantage to produce a polymer membrane that is excellent for pervaporation, especially of mixtures containing water, and at the same time has a high selectivity and permeability for water.

According to this invention, the starting polymer used for such grafting is selected from synthetic polymers that can be processed into thin films by means of a suitable process and are partially crystalline at room temperature or are below their glass transition temperature. Suitable processes include melt extrusion, peeling or casting. Preferably, homogeneous, dense or sintered films with a thickness of 1 μm to 1 mm, preferably 5 to 200 μm and especially 8 to 100 μm, are used. Suitable polymers according to this invention especially include those having a long-term stability in the presence of boiling ethanol, where long-term stability is understood to mean that the polymer films do not undergo any significant change when boiled in ethanol for 10 hours or more and their dimensional stability is not impaired by this treatment. Suitable polymers for this invention include polyethylene (PE, mp≃130° C.), polypropylene (PP, mp≃180° C., isotactic PP), polyvinyl chloride (PVC, mp≃180° C.), polyvinyl fluoride (PVF, mp≃185° C.), polyvinylidene fluoride (PVF2, mp≃170° C.), poly(tetrafluoroethylene-co-hexafluoropropene) (PFEP, mp≃260° C.), poly(tetrafluoroethylene) (PTFE, mp≃330° C.), poly(chlorotrifluoroethylene) (PCTFE, mp≃220° C.), polytetrafluoroethylene-co-ethylene) (PCTFE/E, mp≃264° C.) and polyacrylonitrile (PAN, mp≃317° C.). Films of partially fluorinated polymers, especially films of polyvinylidene fluoride and polyvinyl fluoride, are especially preferred.

In a preferred version the polymer films are drawn axially or biaxially, which has a positive effect on the swelling properties of the membrane produced from them.

Irradiation of the polymer films is done in the manner described above using ionizing radiation where an electron energy of at least 150 keV, a dose rate of 3 to 20 kGy/sec and a total radiation dose of 20 to 250 kGy are especially preferred. The irradiation is performed either in air or preferably in an inert gas atmosphere with an $O_2$ concentration of ≦100 ppm.

The grafting reaction can involve the entire thickness of the polymer film or it may take place only in partial areas of the film. Grafting in partial areas may be of interest when a membrane that varies in properties over the thickness of the membrane is desired. For most applications, however, complete and consistent grafting is desired and this procedure is preferred.

Pervaporation process

The polymer membrane according to this invention is especially suitable for pervaporation processes whereby small organic molecules added to a liquid are continuously separated from the liquid by using a membrane through which the molecules pass selectively and separation of the molecules takes place by condensation of the molecules by cooling and/or by applying a reduced pressure. One version of the object of this invention is therefore a pervaporation process whereby a liquid that is to be separated is sent through an inlet chamber which is separated from a permeate chamber by a pervaporation membrane. The permeate is removed from the permeate chamber preferably by condensation and the permeate has a much different composition than the feed mixture. The process according to this invention is characterized in that one of the membranes with polymers having a betaine function as defined above is used as the pervaporation membrane.

This invention will now be illustrated further by the following examples.

Determination of the separation properties (separation factor in the standard pervaporation test)

The separation properties of the membranes produced according to this invention were determined on a pervaporation laboratory measurement stand. The feed stream, which is an 80/20 (w/w) EtOH/$H_2O$ mixture in the standard pervaporation test, was pumped through the membrane at about 70° C. A reduced pressure of <40 mbar was produced on the permeate side with the help of a membrane pump. The permeate was collected in cold traps, weighed and analyzed by gas chromatography. The total flow Φ in kg/m²·hr) and the separation factor α was calculated according to the equation $$\alpha = \frac{C^P_{H_2O}}{C^Z_{H_2O}} \times \frac{C^Z_{EtOH}}{C^P_{EtOH}}$$

where C=concentration (wt%), Z=in the feed stream and P=in the permeate.

Determination of the depth of penetration of grafting in the polymer film

The depth of penetration of grafting and especially whether and under which conditions the polymer films are or become completely grafted all the way through was determined with the help of differential interference contrast microscopy (DICM) on thin sections of membrane samples.

EXAMPLE 1

A melt extruded, biaxially drawn polymer film of polyvinyl fluoride (PVF) with a thickness of 15 μm was irradiated at room temperature in a nitrogen atmosphere ($O_2$ concentration ≦100 ppm) with 160 keV electrons at a dose rate of $D_L$ = 12 kGy/sec (1.2 Mrd/sec) up to a total dose of D = 36 kGy (3.6 Mrd).

About 2 minutes after the conclusion of the irradiation treatment, the irradiated PVF film was immersed for 95 minutes in a monomer bath consisting of pure N-vinylimidazole regulated thermostatically at 65° C. and the entire film thickness was grafted. The above-mentioned differential interference contrast microscopy method was used to ascertain whether grafting was complete. Then the grafted PVF film was extracted at reflux for 16 hours with a mixture of ethanol/$H_2O$ and dried for 16 hours at 50° C. under reduced pressure.

The degree of grafting was determined gravimetrically as DG = 110%. Formulation of the betaine function was accomplished in a 5% solution of bromoacetic acid in 95% ethanol at 80° C. with a 1 hour reaction time. The converted graft polymer specimen was extracted briefly in $H_2O$ and then placed in 1% sodium hydroxide solution for 0.5 hours. The film was rinsed briefly with water and dried for 16 hours at 50° C. under reduced pressure. A conversion of 45% of the imidazole groups was ascertained by a gravimetric analysis. In the standard pervaporation test the finished PVF-g-VIA membrane yielded 6.1% ethanol in the permeate, corresponding to a separation factor of α≃59, and a total permeate flow of $\Phi \simeq 1.4$ kg/m²·hr. The membrane thickness was 34 μm.

EXAMPLE 2

A melt extruded, biaxially drawn polymer film of polyvinyl fluoride (PVF) 15 μm thick was irradiated at room temperature in a nitrogen atmosphere (O₂ concentration $\leq 100$ ppm) with 160 keV electrons at a dose rate of $D_L = 8$ kGy/sec (0.8 Mrd/sec) up to a total dose of $D = 21$ kGy (2.1 Mrd).

Grafting was performed as in Example 1 but with 4-vinylpyridine at 67° C. with a reaction time of 101 minutes. The degree of grafting was 253%. Formation of the betaine function was accomplished as in Example 1. The degree of conversion with bromoacetic acid was 51% of the pyridine groups. In the standard pervaporation test the finished PVF-g-4-VPY membrane yielded 5.4% ethanol in the permeate, corresponding to a separation factor of 68 and a permeate flow of $\Phi \simeq 2.1$ kg/m²·hr. The membrane thickness was 71 μm.

EXAMPLE 3

A melt extruded, undrawn polymer film of polyvinylidene fluoride (PVF2) 25 μm thick was irradiated as described in Example 1 but up to a total dose of 75 kGy (7.5 Mrd).

Grafting was performed as in Example 1 but with 4-vinylpyridine as the graft monomer at 69° C. with a reaction time of 55 minutes. The degree of grafting was 37%. Formation of the betaine function was accomplished in 5% solution of γ-propanesultone in 95% ethanol at $\simeq 75°$ C. with a reaction time of 30 minutes. Then the specimen was extracted briefly in ethanol and dried for 16 hours at 50° C. under reduced pressure. The degree of conversion to the betaine function was >95% of the pyridine groups.

In deviation from the standard test conditions a feed mixture with 94.8% ethanol and 5.2% water was used in the pervaporation experiment. The finished PVF2-g-4-VPY membrane yielded 4.1% ethanol in the permeate, corresponding to a separation factor of $\alpha \simeq 430$ and a permeate flow of 0.07 kg/m²·hr. The membrane thickness was 50 μm.

EXAMPLE 4

A melt extruded, undrawn polymer film of polyvinylidene fluoride (PVF₂) 25 μm thick was irradiated as described in Example 1, but with a dose rate of 3 kGy/sec (0.3 Mrd/sec) and a total dose of 18 kGy (1.8 Mrd).

Grafting was performed as in Example 1 but with 4-vinylpyridine as the graft monomer at 70° C. with a reaction time of 55 minutes. The degree of grafting was 31.3%. The betaine function was formed as described in example 1 using bromoacetic acid but with a reaction time of 120 minutes. After the reaction, in deviation from Example 1, the converted PVF₂-g-4-VPY membrane was treated in 5% potassium hydroxide solution with a retention time of 10 minutes. The degree of conversion to the betaine function was >95% of the pyridine groups.

In the standard pervaporation test the finished PVF₂-g-4-VPY membrane yielded 1.9% ethanol in the permeate, corresponding to a separation factor of $\alpha \simeq 215$ and a permeate flow of 0.47 kg/m²·hr. The membrane was 35 μm thick.

EXAMPLE 5

A melt extruded, biaxially drawn polymer film of polyvinylidene fluoride (PVF₂) 9 μm thick was irradiated as in Example 1 but with a total dose of 53 kGy (5.3 Mrd).

Grafting was performed as in Example 1 but with 4-vinylpyridine as the graft monomer at 80° C. with a reaction time of 70 minutes. The degree of grafting was 45%. The betaine function is as in Example 1. The degree of conversion to betaine function is 90% of the pyridine groups.

In the standard pervaporation test the finished PVF₂-g-4-VPY membrane yielded 4.25[%] ethanol in the permeate, corresponding to a separation factor of $\alpha \simeq 91$ and a permeate flow of 0.25 kg/m²·hr. The membrane was 15 μm thick.

We claim:

1. Polymer membrane comprising a polymer with a main molecular chain of the following formula

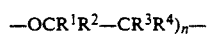

wherein the substituents $R^1$ to $R^4$, which may be the same or different, stand for H, Cl or F atoms, alkyl groups or substituted alkyl groups, aryl groups or substituted aryl groups, or CN groups, and n is an integer, said polymer having at least one betaine function formed by grafting said polymer with a monomer that either has, or is capable of so forming, a betaine function, and said betaine function comprises a positive site and a negative site both covalently bound to said polymer.

2. A pervaporation process wherein the polymer membrane of claim 1 is used.

3. The polymer membrane of claim 1 wherein said alkyl groups or substituted alkyl groups are halogenated.

4. The polymer membrane of claim 1 wherein said alkyl groups or substituted alkyl groups have 1-8 carbon atoms.

5. The polymer membrane of claim 1 wherein said aryl groups or substituted aryl groups are halogen-substituted.

6. The polymer membrane of claim 1 wherein said aryl groups or substituted aryl groups have 6-18 carbon atoms.

7. The polymer membrane of claim 1 wherein said betaine function is formed from organic groups with at least one quaternary nitrogen as the positive center of the betaine function and at least one acid group as the negative center of the betaine function.

8. The polymer membrane of claim 7 wherein the acid groups comprise sulfonic acid groups or carboxylic acid groups.

9. The polymer membrane of claim 7 wherein the quaternary nitrogen is a heterocyclic nitrogen.

10. The polymer membrane of claim 1 wherein the betaine function has a structure selected from the group comprising:

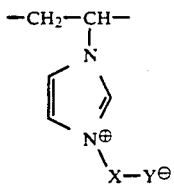 (a)

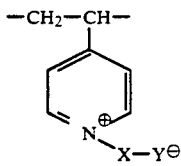 (b)

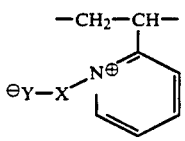 (c)

and

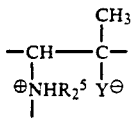 (d)

wherein x is a hydrocarbon group with 1 to 10 carbon atoms and y is an acid group.

11. Process for producing a polymer membrane comprising the steps of:
(a) forming a polymer film consisting of a polymer of the following formula I $$-(CR^1R^2-CR^3R^4)_n-\qquad (I)$$

wherein the substituents $R^1$ to $R^4$, which may be the same or different, stand for H, Cl or F atoms, alkyl groups or substituted alkyl groups, aryl groups or substituted aryl groups, or CN groups, and n is an integer;
(b) irradiating said polymer film with ionizing radiation; and
(c) grafting the irradiated polymer film with a monomer or monomer mixture, wherein the monomer or monomers of the mixture either
contain functional groups that have at least one betaine function or
contain at least one functional group suitable for being converted to a betaine function which functional group is converted to a betaine function following the grafting reaction.

12. Process according to claim 11 wherein the polymer film is a homogenous dense film.

13. Process according to claim 12 wherein the polymer film is a melt extruded, peeled, sintered or cast film.

14. Process according to claim 13 wherein the polymer film is 1 μm to 1 mm thick.

15. Process according to claim 14 wherein the polymer film is 5 to 200 μm thick.

16. Process according to claim 15 wherein the polymer film is grafted over its entire thickness.

17. The process of claim 11 wherein said alkyl groups or substituted alkyl groups are halogenated.

18. The process of claim 11 wherein said alkyl groups or substituted alkyl groups have 1-8 carbon atoms.

19. The process of claim 11 wherein said aryl groups or substituted aryl groups are halogen substituted.

20. The process of claim 11 wherein said aryl groups or substituted aryl groups have 6-18 carbon atoms.

21. The process of claim 11 wherein the polymer (I) is selected from the group consisting of polyethylene, polypropylene, polyvinyl fluoride, polyvinylidene fluoride, polytetrafluoride, polyvinyl chloride, polyvinylidene chloride, a copolymer of polyethylene, polypropylene and halogenated polyolefins.

22. The process of claim 11 wherein the monomers in step (c) are capable of entering into a radical graft reaction.

23. The process of claim 11 wherein the monomer or monomers of the mixture containing at least one functional group suitable for being converted to a betaine function of step (b) have a graftable carbon-carbon double bond and a nitrogen that is quaternatable, and wherein the process further comprises quaternating the nitrogen and alkylating the nitrogen with an alkylating reagent to form the positive center of the betaine function, said alkylating reagent having a functional group with an acid group which forms the negative center of the betaine function.

24. The process of claim 23 wherein said nitrogen is a heterocyclic quaternatable nitrogen.

25. The process of claim 24 wherein the acid group of the alkylating reagent is a carboxylic acid group or a sulfonic acid group and the reagent has 1 to 10 carbon atoms.

26. The process of claim 24 wherein the alkylating reagent has 1 to 10 carbon atoms and the acid group of said alkylating reagent is a carboxylic acid ester group or a sulfonic acid ester group, and wherein the process further comprises saponifying said ester group during or after step (c).

27. The process of claim 23 wherein the monomer or monomers of the mixture comprise 2-vinylpyridine, 4-vinylpyridine or N-vinylimidazole.

28. The process of claim 27 wherein the alkylating reagent comprises a halogenated carboxylic acid with 1 to 10 carbon atoms, a salt of said halogenated carboxylic acid, a halogenated carboxylic acid ester with 1 to 10 carbon atoms in the carboxylic acid, a halogenated sulfonic acid with 1 to 10 carbon atoms, a salt of said halogenated sulfonic acid, of a cyclic sulfonic acid ester with 2 to 10 carbon atoms.

29. The process of claim 28 wherein the alkylating reagent comprises chloroacetic acid, bromoacetic acid, 4-(bromomethyl) benzoic acid, 2-bromopropionic acid, 3-bromopropionic acid, 1-bromoethanesulfonic acid, 4-(bromomethyl) benzenesulfonic acid, a sodium, potassium, or ammonium salt of one of said acids, methyl bromoacetates, γ-propanesultone or, δ-hexanesultone.

30. The process of claim 11 wherein the monomer or monomers of the mixture have an olefinic carbon-carbon double bond, a quaternatable nitrogen and a functional group with an acid character.

31. The process of claim 30 wherein the monomer or monomers of the mixture have 1 to 10 carbon atoms and the functional group with an acid character is a carboxylic acid group or a sulfonic acid group.

32. The process according to claim 30 wherein the monomer or monomers of the mixture have 1 to 10 carbon atoms and the functional group with an acid character is a carboxylic acid ester group or sulfonic acid ester group, and wherein the process further comprises saponifying said ester group during or after step (c).

33. The process of claim 11 wherein the ionizing radiation comprises accelerated electrons.

34. The process of claim 33, wherein the accelerated electrons have an electron energy of at least 150 keV and a dose rate of at least 1 kGy/sec.

35. The process of claim 34, wherein the dose rate is 3 to 50 kGy/sec.

36. The process of claim 35, wherein the total dose is 10 to 100 kGy.

37. The process of claim 33, wherein the irradiation is performed under an inert gas atmosphere.

38. Polymer membrane obtained by a process comprising the steps of:
(a) irradiating with ionizing radiation a polymer film comprising a polymer of the following formula $$-(CR^1R^2-CR^3R^4)_n-$$

wherein the substituents $R^1$ to $R^4$, which may be the same or different, stand for H, Cl or F atoms, alkyl groups or substituted alkyl groups, aryl groups or substituted aryl groups, or CN groups and n is an integer; and
(b) grafting the irradiated polymer film with a monomer or monomer mixture, where in the monomer or monomers of the mixture either
contain functional groups that have at least one betaine function or
contain at least one functional group suitable for being converted to a betaine function, which functional group is converted to a betaine function following the grafting reaction.

39. The polymer membrane of claim 38 wherein said alkyl groups or substituted alkyl groups are halogenated.

40. The polymer membrane of claim 38 wherein said alkyl groups or substituted alkyl groups have 1–8 carbon atoms.

41. The polymer membrane of claim 38 wherein said aryl groups or substituted aryl groups are halogen-substituted.

42. The polymer membrane of claim 38 wherein said aryl groups or substituted aryl groups have 6–18 carbon atoms.

43. A pervaporation process for separating a group of molecules from other molecules in a liquid by using a membrane through which the group of molecules passes preferentially relative to the other molecules, and said membrane comprises the membrane of claim 1.

44. The pervaporation process of claim 43 wherein the condensation is done by cooling.

45. The pervaporation process of claim 43 wherein the condensation is done by applying ar reduced pressure.

* * * * *

UNITED STATES PATENT AND TRADEMARK OFFICE
CERTIFICATE OF CORRECTION

PATENT NO. : 5,164,424
DATED : November 17, 1992
INVENTOR(S) : Brueschke, et. al.

It is certified that error appears in the above-indentified patent and that said Letters Patent is hereby corrected as shown below:

Column 14, line 25, "$-OCR^1R^2-CR^3R^4)n-$" should be

-- $-(CR^1R^2-CR^3R^4)n-$ --

Signed and Sealed this

Nineteenth Day of October, 1993

Attest:

BRUCE LEHMAN

*Attesting Officer*  *Commissioner of Patents and Trademarks*